United States Patent
Janke et al.

(10) Patent No.: US 10,767,083 B2
(45) Date of Patent: Sep. 8, 2020

(54) POLYOLEFIN HOT-MELT GLUE HAVING A LOW REACTIVATION TEMPERATURE AND HIGH HEAT STABILITY AND USE THEREOF FOR VACUUM DEEP-DRAWING LAMINATION

(71) Applicant: SIKA TECHNOLOGY AG, Baar (CH)

(72) Inventors: Doreen Janke, Alveslohe (DE); Kai Paschkowski, Jork (DE); Mathias Cordes, Hamburg (DE); Dirk Urbach, Ahrensburg (DE)

(73) Assignee: SIKA TECHNOLOGY AG, Baar (CH)

( * ) Notice: Subject to any disclaimer, the term of this patent is extended or adjusted under 35 U.S.C. 154(b) by 95 days.

(21) Appl. No.: 15/753,891

(22) PCT Filed: Sep. 13, 2016

(86) PCT No.: PCT/EP2016/071489
§ 371 (c)(1),
(2) Date: Feb. 20, 2018

(87) PCT Pub. No.: WO2017/046045
PCT Pub. Date: Mar. 23, 2017

(65) Prior Publication Data
US 2018/0251660 A1 Sep. 6, 2018

(30) Foreign Application Priority Data

Sep. 14, 2015 (EP) .................... 15185088

(51) Int. Cl.
*C09J 5/06* (2006.01)
*B32B 27/32* (2006.01)
(Continued)

(52) U.S. Cl.
CPC .............. *C09J 5/06* (2013.01); *B32B 7/12* (2013.01); *B32B 15/085* (2013.01); *B32B 27/12* (2013.01); *B32B 27/30* (2013.01); *B32B 27/302* (2013.01); *B32B 27/304* (2013.01); *B32B 27/32* (2013.01); *B32B 27/34* (2013.01); *B32B 27/36* (2013.01); *B32B 27/365* (2013.01); *B32B 37/1207* (2013.01); *C08J 5/128* (2013.01); *C08L 23/14* (2013.01); *C08L 51/06* (2013.01); *C09J 123/02* (2013.01); *C09J 123/14* (2013.01); *B32B 2037/1223* (2013.01); *B32B 2250/02* (2013.01); *B32B 2255/02* (2013.01); *B32B 2255/06* (2013.01); *B32B 2255/08* (2013.01); *B32B 2255/10* (2013.01); *B32B 2262/0253* (2013.01);
(Continued)

(58) Field of Classification Search
CPC . C09J 5/06; C09J 123/02; C09J 123/14; C09J 2423/00; C09J 2451/00; C09J 2423/006; C09J 2491/00; B32B 7/12; B32B 15/085; B32B 27/12; B32B 27/30; B32B 27/302; B32B 27/304; B32B 27/32; B32B 27/34; B32B 27/36; B32B 27/365; B32B 37/1207; B32B 2037/1223; B32B 2250/02; B32B 2255/02; B32B 2255/06; B32B 2255/08; B32B 2255/10; B32B 2262/0253; B32B 2262/0276; B32B 2262/04; B32B 2262/062; B32B 2262/14; B32B 2323/04; B32B 2605/00; C08J 5/128; C08J 2309/06; C08J 2323/12; C08J 2423/02; C08J 2491/06; C08L 23/14; C08L 51/06; C08L 2207/14; C08L 2666/06
USPC ........................................................ 156/286
See application file for complete search history.

(56) References Cited

U.S. PATENT DOCUMENTS

| | | | |
|---|---|---|---|
| 6,677,396 B2 * | 1/2004 | Tsui | .................. C09J 123/14 524/476 |
| 2012/0328805 A1 | 12/2012 | Davis | |
| 2015/0240135 A1* | 8/2015 | Janke | ..................... C09J 5/06 156/320 |

FOREIGN PATENT DOCUMENTS

| | | |
|---|---|---|
| CN | 104755573 A | 7/2015 |
| DE | 40 00 695 A1 | 7/1991 |

(Continued)

OTHER PUBLICATIONS

Technical Data Sheet, Vestoplast 704.*
(Continued)

*Primary Examiner* — Michael N Orlando
*Assistant Examiner* — Abhishek A Patwardhan
(74) *Attorney, Agent, or Firm* — Oliff PLC

(57) ABSTRACT

A hot-melt glue composition, including a) at least one atactic poly-α-olefin (APAO) that is solid at 25° C.; b) at least one hydrocarbon resin having a softening point of at least 80° C., measured in accordance with the ring-and-ball method according to DIN EN 1238; and c) at least one maleic-anhydride-grafted wax having a softening point of not more than 150° C., measured in accordance with the ring-and-ball method according to DIN EN 1238, which is a maleic-anhydride-grafted polypropylene wax or a maleic-anhydride-grafted polyethylene wax, wherein the proportion of the at least one maleic-anhydride-grafted wax in the hot-melt glue composition is at least 3 wt %. The hot-melt glue composition is characterized by a low reactivation temperature, together with high heat resistance and good adhesion to ABS and nonpolar polyolefin materials. The hot-melt glue composition is well suited for film lamination by vacuum deep-drawing lamination, in particular for applications in automobile construction.

4 Claims, No Drawings

(51) Int. Cl.
*C09J 123/14* (2006.01)
*C08L 23/14* (2006.01)
*B32B 27/36* (2006.01)
*B32B 27/30* (2006.01)
*C08L 51/06* (2006.01)
*B32B 27/12* (2006.01)
*B32B 7/12* (2006.01)
*B32B 27/34* (2006.01)
*B32B 15/085* (2006.01)
*B32B 37/12* (2006.01)
*C08J 5/12* (2006.01)
*C09J 123/02* (2006.01)

(52) U.S. Cl.
CPC ... *B32B 2262/0276* (2013.01); *B32B 2262/04* (2013.01); *B32B 2262/062* (2013.01); *B32B 2262/14* (2013.01); *B32B 2323/04* (2013.01); *B32B 2605/00* (2013.01); *C08J 2309/06* (2013.01); *C08J 2323/12* (2013.01); *C08J 2423/02* (2013.01); *C08J 2491/06* (2013.01); *C08L 2207/14* (2013.01); *C08L 2666/06* (2013.01); *C09J 2423/00* (2013.01); *C09J 2423/006* (2013.01); *C09J 2451/00* (2013.01); *C09J 2491/00* (2013.01)

(56) References Cited

FOREIGN PATENT DOCUMENTS

| EP | 1 125 980 A1 | 8/2001 | |
|----|---|---|---|
| EP | 2 730 626 A1 | 5/2014 | |
| WO | 02/36704 A1 | 5/2002 | |
| WO | 2007/142749 A1 | 12/2007 | |
| WO | WO-2014072396 A1 * | 5/2014 | ............... C09J 5/06 |

OTHER PUBLICATIONS

Technical Data Sheet, Regalite R1090.*
Oct. 19, 2016 International Search Report issued in International Patent Application No. PCT/EP2016/071489.
Mar. 20, 2018 International Preliminary Report on Patentability issued in International Patent Application No. PCT/EP2016/071489.
Apr. 3, 2020 Office Action issued in Chinese Patent Application No. 201680051442.6.

* cited by examiner

POLYOLEFIN HOT-MELT GLUE HAVING A LOW REACTIVATION TEMPERATURE AND HIGH HEAT STABILITY AND USE THEREOF FOR VACUUM DEEP-DRAWING LAMINATION

TECHNICAL FIELD

The invention relates to the field of hotmelt adhesives and more particularly to the field of atactic poly-α-olefin hotmelt adhesives.

PRIOR ART

Hotmelt adhesives have been known for a long time and are used in particular as laminating adhesives. Hotmelt adhesives are also referred to simply as hotmelts.

One type of hotmelt adhesives is based on polyolefins. These are more particularly hotmelt adhesives based on atactic poly-α-olefins (APAO hotmelts). They usually contain thermoplastic polyolefin copolymers and terpolymers, blended with other polymers and resins. Immediately after their application, such adhesives cool and, in so doing, develop a high initial adhesive strength, and they acquire their final properties, especially heat stability and resistance to environmental effects, through the gradual process of physical setting. APAO hotmelts typically enjoy effective adhesion to polypropylene and polyethylene.

For foil lamination by vacuum forming, the adhesives used are predominantly polyurethane (PU) adhesives in various forms. The PU adhesives are also used predominantly in dispersed or dissolved form. With these adhesive systems, the high molecular weight of the PU necessitates working by a contact method. What this means is that the adhesives must be applied in dispersion or solution in a liquid to the substrate component, in order to be able to develop effective adhesion to the substrate component. The foil to be laminated is primer-treated. In the laminating operation itself, the foil is heated and is pressed onto the substrate component by vacuum. The adhesive on the substrate then bonds to the primer of the foil.

A disadvantageous feature of using dissolved or dispersed adhesives is the applying of the adhesive to the substrate component. The substrate components have generally undergone three-dimensional forming. The adhesive must be applied to this formed substrate by spraying. This procedure is relatively costly and inconvenient. Particularly critical is the overspray that is produced.

In order to overcome this disadvantage, recent times have seen increasing attempts to use PU adhesives in the form of reactive hotmelts for foil lamination. When hotmelts are used, there is no need for the three-dimensionally formed substrate component to be sprayed. It is sufficient for the adhesive to be brought onto the foil. This is much easier, since the foil is two-dimensional. The adhesive can easily be applied as a film by various techniques to the foil without overspray, in other words without losses.

Reactive polyurethane compositions which can be employed as hotmelt adhesives are known (PU RHMs). They consist usually of isocyanate-terminated polyurethane prepolymers which are obtained by reaction of suitable polyols with an excess of diisocyanates. Such adhesives develop a high initial adhesive strength by cooling immediately after they have been applied, and acquire their ultimate properties, especially heat stability and resistance to environmental effects, by the gradual process of curing, i.e., the chemical reaction of the isocyanate groups with atmospheric moisture. At the processing stage, the reactive PU RHM has a much lower molecular weight than the dissolved or dispersed PU adhesives.

The PU adhesives that are nowadays employed for laminating, whether processed from solution, from dispersion or as a hotmelt, have a serious disadvantage in the context of their use on olefinic substrates. The substrates in question must be pretreated, since otherwise the polar PU adhesive would not adhere to the apolar olefinic surface.

For this reason, adhesives based on amorphous poly-α-olefins (APAOs) are particularly suitable for the laminating of olefinic substrates. Despite this massive advantage, in practice hardly any such adhesive systems are encountered in the laminating application. The reason for this is that the olefinic adhesives presently on the market are in most cases unsuited to vacuum forming lamination, or exhibit massive disadvantages.

Hotmelt adhesives based on silane-grafted poly-alpha-olefins are known to the person skilled in the art from DE-A1-4000695, for example. These adhesives have very interesting properties. The adhesives exhibit very good adhesion on olefinic substrates and a high heat stability after crosslinking. Reactive polyolefin hotmelts are still relatively young as compared with all of the adhesive technologies identified before, and are therefore rarely used today for laminating in the automobile segment.

In view of the chemical basis, the processing without a liquid vehicle, i.e., as a hotmelt, and the chemical aftercrosslinking by means of silane curing, this technology appears to be particularly suited to the laminating of olefinic substrates. Today, reactive APAO hotmelts of this kind are already encountered in certain applications in the vehicle segment. For vacuum press lamination, however, this technology is still not suitable, since the reaction with atmospheric moisture gives the reactive adhesives a relatively short reactivation time, in the region of a few hours. Vacuum laminating, however, requires long reactivation times, since the TPO foils are usually precoated and are stored temporarily for days or weeks ahead of further processing.

Reactive polyolefin hotmelts are unsuitable for vacuum forming lamination not only on account of their crosslinking reaction with atmospheric moisture and the excessively short reactivation time this entails, but also on account of the excessively high reactivation temperature, which is unsuitable for such processes.

While olefinic adhesives are available as dissolved systems, the desire within the industry generally is to move away from the processing of solvent-containing adhesives. Furthermore, the solvents suitable for dissolving an apolar, olefinic adhesive are particularly critical in their use.

Hotmelts on an olefinic basis, conversely, are very widespread in their use, including their use in the automobile industry. As thermoplastic adhesives, however, they are usually not employed for the lamination of three-dimensionally formed substrate components. Without chemical curing at least to the elastomer, the adhesive is inadequate in its cohesion under hot conditions to maintain the bond over the long term. Owing to the high softening point as well, moreover, APAOs with high heat stability are not suitable for vacuum forming, since the temperature introduced is not sufficient at activation. The advantage of APAO hotmelts, however, is that they are particularly suitable for preliminary foil coating applications. The adhesive can be applied to the foil—a TPO foil, for example—in a separate coating step. Prior to further processing in a laminating operation, these precoated rolls can be stored temporarily even for months.

Soft APAO hotmelts are highly suited in principle to the laminating of TPO foils in a vacuum press lamination process, but immediately after lamination they adhere too strongly to the mold and/or have too low a heat stability. The adhesion of the APAO to the surface of the laminating mold is too strong, and the heat stability of the assembly is too low for automotive applications. This makes it impossible for them to be used in practice. The more strongly performing APAO hotmelts require too high a reactivation temperature. For this reason, such hotmelts are unsuitable in practice for lamination.

In addition to the adhesion to apolar substrates, the adhesion to polar substrates is of interest as well. In general, APAO hotmelts also adhere to substrates made of acrylonitrile-butadiene-styrene (ABS). Effective wetting of the adhesive is ensured during application of the adhesive by the introduction of high temperature. During the application of beads, the required relatively high temperature is introduced into the system at the same time. In contrast to assembly bonds, the laminating of foils (e.g., TPO foil) onto ABS operates only with very thin adhesive-layer thicknesses. Prior to bonding, the adhesive applied to the flexible substrate (e.g., TPO foil) is reactivated, leading to the softening and melting of the adhesive. At the point of the actual wetting of the activated adhesive on the substrate surface (e.g., ABS), only temperatures of between 50 and 70° C. are attained.

Under these conditions, even with well-adhering hot-melt adhesive products, laminating is no longer possible, since the heat introduced is not sufficient to provide adequate melting or softening of the adhesive. Theoretically, very soft APAO hotmelts function very well, since they wet very well on the substrate surface at the low temperatures. A disadvantage of these adhesives, however, is that their heat stability is too low and they cannot be used for demanding laminations.

In the case of what is called IMG lamination, even lower temperatures are obtained during wetting of the substrate surface, and so the demands made on the hotmelt adhesive are even greater.

WO 2007/142749 A1 relates to a hotmelt adhesive for the bonding of polypropylene fabric, the adhesive comprising an amorphous poly-alpha-olefin, an amorphous propylene-butene copolymer, grafted polyethylene, and a wax. The grafted polyethylene used may by maleic anhydride-grafted polyethylene.

EP 1125980 A1 describes a hotmelt adhesive for producing paper impermeable to water vapor. The examples use amorphous poly-alpha-olefins, hydrocarbon resins, and a maleic anhydride-modified polypropylene for this production.

WO 02/36704 A1 describes an adhesive for bonding polypropylene fabric, the adhesive comprising an amorphous poly-alpha-olefin, grafted polypropylene, and a tackifier. The examples use maleic anhydride-grafted polypropylene.

US 2012/328805 A1 describes a hotmelt adhesive and the use thereof for producing packaging. For preparing the adhesive, the examples use, e.g., amorphous poly-alpha-olefin, polyethylene wax, and maleic anhydride-grafted polypropylene.

EP 2730626 A1 describes a reactive hotmelt adhesive and the use thereof for producing assemblies in a thermoforming process. The examples use, e.g., silane-modified amorphous poly-alpha-olefin, unmodified amorphous poly-alpha-olefin, paraffin wax having a dropping point in the range of 108-124° C., and maleic anhydride-grafted polypropylene having a softening point of around 140° C.

SUMMARY OF THE INVENTION

It is an object of the present invention, therefore, to provide hotmelt adhesives which overcome the aforementioned disadvantages of the prior art. The aim in particular is to provide a hotmelt adhesive which has a low reactivation temperature in conjunction with high heat stability and which also exhibits effective adhesion to polar substrates, especially ABS. The hotmelt adhesive is to be suitable in particular for vacuum forming lamination. Its use in the context of IMG lamination ought also to be possible.

Surprisingly it has emerged that a hotmelt adhesive based on atactic poly-α-olefins with a suitable selection of additive components is capable of achieving this object.

The invention therefore relates to a hotmelt adhesive composition as defined in claim 1.

Features of the hotmelt adhesive composition of the invention are that it has a low reactivation temperature in conjunction with high heat stability, and exhibits effective adhesion to ABS, and is therefore very suitable for vacuum forming lamination. The composition of the invention is also particularly suitable for IMG lamination.

The hotmelt adhesive compositions possess a broad adhesion spectrum and adhere well to low-energy surfaces such as polyolefin films, especially polyethylene films, e.g., TPO films.

Further aspects of the present invention are the use of the hotmelt adhesive composition for foil lamination, a method for producing an assembly by adhesive bonding with the hotmelt adhesive composition, and the assembly thus produced. Preferred embodiments of the invention are subjects of the dependent claims.

CERTAIN EMBODIMENTS OF THE INVENTION

The softening point in the present document is understood in each case to be the softening point as measured by the ring & ball method according to DIN EN 1238, unless otherwise indicated.

Molecular weight is understood in the present document to be the number average of the molecular weight (Mn). The molecular weight may be determined by gel permeation chromatography (GPC) with styrene as standard.

The quantity figures are always based on the total weight of the hotmelt adhesive composition, unless otherwise indicated.

Abbreviations used are as follows:
ABS acrylonitrile-butadiene-styrene
APAO atactic poly-α-olefin, also referred to as amorphous poly-α-olefin
HC hydrocarbon
TPO thermoplastic, olefin-based elastomer The expressions "hotmelt adhesive composition", "hotmelt adhesive", and "hotmelt" are used below as synonymous expressions.

In a first aspect, the present invention relates to a hotmelt adhesive composition which comprises
a) at least one atactic poly-α-olefin (APAO) which is solid at 25° C.;
b) at least one hydrocarbon resin having a softening point of at least 80° C., measured by the ring & ball method according to DIN EN 1238; and c) at least one maleic anhydride-grafted wax having a softening point of not more than 150° C., measured by the ring & ball method according to DIN EN 1238, which is a maleic anhydride-grafted polypropylene wax or a maleic anhydride-grafted polyethylene wax, where the fraction of the at least one maleic anhydride-grafted wax is at least 3 wt %.

The composition of the invention is in particular a non-reactive polyolefin hotmelt adhesive, more particularly a nonreactive poly-α-olefin hotmelt adhesive, meaning that the APAO in the hotmelt adhesive composition has no reactive groups via which chemical crosslinking would be possible, such as silane groups, for example. Hence, for example, the hotmelt adhesive composition contains in particular no APAO containing silane groups.

The atactic poly-α-olefin which is solid at 25° C. is, in particular, thermoplastic. The APAOs may be homopolymers or copolymers. The copolymers may for example be polymers of two, three or more olefin monomers.

Atactic poly-α-olefins can be prepared by polymerization of α-olefins, more particularly of ethene, propene and 1-butene, using—for example—Ziegler catalysts. The APAOs may be homopolymers or copolymers of α-olefins. Relative to other polyolefins, they have an amorphous structure.

An α-olefin is understood in this document, in the usual definition, to be an alkene with the empirical formula $C_xH_{2x}$ that has a C—C double bond on the first carbon atom (α-carbon). The index x corresponds to the number of carbon atoms, and x for example is in the range from 2 to 15, preferably 2 to 8, more preferably 2 to 4. Examples of α-olefins are ethylene, propylene, 1-butene, 1-pentene, 1-hexene, 1-heptene, and 1-octene. Accordingly, for example, neither 1,3-butadiene nor 2-butene or styrene are α-olefins.

The at least one APAO has, for example, a softening point in the range from 70° C. to 170° C., preferably from 80° C. to 150° C., and more preferably from 90° C. to 140° C.

The at least one APAO preferably has a molecular weight Mn in the range of 6000 and 25 000 g/mol.

One or more APAOs may be used. It is possible, for example, to use two APAOs in the hotmelt adhesive, advantageously in a weight ratio of first APAO to second APAO in the range from 60:40 to 40:60.

Suitable thermoplastic APAOs are available commercially, examples being Vestoplast®703 and Vestoplast®792 from Evonik.

The hotmelt adhesive composition comprises, for example, 40 to 85 wt %, preferably 60 to 80 wt %, of the at least one APAO.

The hotmelt adhesive composition further comprises at least one hydrocarbon resin having a softening point of at least 80° C., preferably at least 90° C., and more preferably at least 100° C. The at least one hydrocarbon resin has, for example, a softening point in the range from 80° C. to 150° C., preferably from 90° C. to 140° C. or from 100° C. to 130° C. The hydrocarbon resin is more particularly a hydrocarbon resin which is solid at 25° C. Such resins are also referred to as solid resins.

One or more hydrocarbon resins may be used. The hydrocarbon resin may be, for example, a petroleum resin, a coal tar resin or a polyterpene resin, each of which may optionally have been modified.

The hydrocarbon resin may be, for example, an aliphatic, aromatic or cyclic hydrocarbon resin. It may also be a modified hydrocarbon resin, as for example a partially or fully hydrogenated aromatic hydrocarbon resin or an aromatically modified hydrocarbon resin; an aliphatic hydrocarbon resin is preferred.

The hydrocarbon resin is preferably a C5-C9 hydrocarbon resin, very preferably an aliphatic C5-C9 hydrocarbon resin.

Suitable hydrocarbon resins are available commercially, examples being Hikorez®A-2115, Hikorez®A-1100, and Sukorez®SU-400, all from Kolon Industries, Inc, Korea, Regalite®R 7100 from Eastman Chemical Co., USA, Escorez®1401 from Exxon Mobil, USA, and also Wingtack®extra and Wingtack®86, each from Cray Valley USA, more particularly a mixture thereof, in a ratio of Wingtack®extra to Wingtack®86 of, for example, around 60 wt % to around 40 wt %. Aliphatic hydrocarbon resins such as Hikorez®A-2115 are particularly preferred. The hydrocarbon resin gives the adhesive tack on heating.

The hotmelt adhesive composition comprises, for example, 5 to 30 wt %, preferably 10 to 20 wt %, of the at least one hydrocarbon resin. Amounts in the range from around 13 to 18 wt % have proven particularly preferable.

The hotmelt adhesive composition furthermore comprises one or more maleic anhydride-grafted waxes having a softening point of not more than 150° C., which is a maleic anhydride-grafted polypropylene wax or a maleic anhydride-grafted polyethylene wax, with the fraction of the at least one maleic anhydride-grafted wax in the hotmelt adhesive composition being at least 3 wt %. The fraction of the at least one maleic anhydride-grafted wax in the hotmelt adhesive composition is preferably at least 4 wt %, more preferably at least 5 wt %, and very preferably at least 7 wt %.

The at least one maleic anhydride-grafted wax preferably has a softening point in the 100° C. to 150° C. range, preferably from 120° C. to 150° C.

The maleic anhydride-grafted wax is a polar-modified polyolefin wax. With particular preference the maleic anhydride grafted wax is a maleic anhydride grafted polypropylene wax.

The maleic anhydride-grafted wax may be formed, for example, by grafting maleic anhydride onto a polyolefin wax selected from a polypropylene wax or a polyethylene wax. In the case of the polypropylene wax, the wax may be a homopolymer of propylene or a copolymer of propylene. In the case of a polyethylene wax, the wax may be a homopolymer of ethylene or a copolymer of ethylene. The comonomer or comonomers for the propylene copolymer may be, for example, at least one monomer selected from ethylene and olefins, more particularly 1-olefins, having at least 4 carbon atoms, as for example 4 to 12 carbon atoms. The comonomer or comonomers for the ethylene copolymer may be, for example, at least one monomer selected from propylene and olefins, more particularly 1-olefins, having at least 4 carbon atoms, as for example 4 to 12 carbon atoms.

Suitable polyolefin waxes as a basis for the preparation of the maleic anhydride-grafted waxes may be prepared by thermal degradation of branched or unbranched polyolefin plastics or by direct polymerization of olefins. Examples of suitable polymerization processes include radical processes, where the ethylene or propylene is reacted at high pressures and temperatures to form waxes with a greater or lesser degree of branching; in addition there are processes in which ethylene and/or higher 1-olefins such as propylene are polymerized to unbranched or branched waxes with the aid of organometallic catalysts, examples being Ziegler-Natta catalysts or metallocene catalysts.

Preferred waxes are polypropylene waxes or polyethylene waxes which are prepared by Ziegler or metallocene catalysis.

The degree of grafting of the maleic anhydride-grafted wax is, for example, at least 1 wt %, preferably at least 2 wt %, and more particularly at least 3 wt %, of maleic anhydride, based on the weight of the unmodified wax. This degree of grafting is situated preferably in the range from 1 to 15 wt %, more preferably from 3 to 15 wt %, most preferably from 4 to 12 wt %.

The maleic anhydride-grafted wax has a melt viscosity at 170° C., for example, in the range from 10 to 10 000 mPa·s, more particularly 400 to 3000 mPa·s.

The hotmelt adhesive composition comprises, for example, 3 to 20 wt %, preferably 4 to 18 wt %, more preferably 5 to 15 wt %, of the at least one maleic anhydride-grafted wax. Amounts in the range from around 7 to 13 wt % have proven particularly preferable. The maleic anhydride-grafted wax improves the adhesion properties of the hotmelt adhesive.

Suitable maleic anhydride-grafted waxes are available commercially, an example being Licocene®PP MA 6452 from Clariant, a maleic anhydride-grafted polypropylene having a maleic anhydride fraction of 7 wt %.

The hotmelt adhesive composition may optionally comprise further constituents of the kind customary for hotmelts, as for example at least one oil, at least one further thermoplastic polymer and/or at least one additive.

The oil may be any oil customary for hotmelts. Using oils, however, brings disadvantages in terms of the adhesion. Preferably, therefore, the hotmelt adhesive contains no oil.

The hotmelt adhesive composition optionally comprises one or more further thermoplastic polymers, preferably nonreactive thermoplastic polymers. By a further thermoplastic polymer here are meant thermoplastic polymers which differ from the atactic poly-α-olefins, hydrocarbon resins, and maleic anhydride-grafted waxes as defined above.

Examples of a further thermoplastic polymer are homopolymers or copolymers of unsaturated monomers, more particularly from the group encompassing ethylene, propylene, butylene, isobutylene, isoprene, vinyl acetate, higher esters thereof, and (meth)acrylate. Particularly suitable are ethylene-vinyl acetate copolymer (EVA), polypropylene (PP) and polyethylene (PE) as homopolymers.

The fraction of these further thermoplastic polymers, if used at all, ought not to be too great—for example less than 5 wt %, preferably less than 2 wt %, preferably less than 1 wt %, based on the weight of the hotmelt adhesive composition. More particularly, the fraction of polypropylene, if used, ought to be less than 2 wt %, preferably less than 1 wt %, based on the weight of the hotmelt adhesive. In one preferred embodiment the hotmelt adhesive composition contains substantially no further thermoplastic polymers, i.e., less than 0.5 wt %, preferably less than 0.1 wt %.

The hotmelt adhesive composition may optionally comprise one or more additives, selected for example from fillers, plasticizers, adhesion promoters, UV absorbers, UV stabilizers, antioxidants, heat stabilizers, optical brighteners, fungicides, pigments, dyes, and siccatives.

The total weight of components a), b), and c), i.e., the atactic poly-α-olefins solid at 25° C.; the hydrocarbon resins with a softening point of at least 80° C.; and the maleic anhydride-grafted wax with a softening point of not more than 150° C., as defined above, based on the weight of the hotmelt adhesive composition, is preferably at least 60 wt %, more preferably at least 80 wt %, even more preferably 95 wt %, and with particular preference at least 98 wt %.

The hotmelt adhesive composition may be produced by mixing the components in a customary way known to the person skilled in the art for hotmelt adhesives.

The hotmelt adhesive composition of the invention preferably has a melting or softening point in the range from 100 to 160° C., more particularly from 110 to 140° C.

The hotmelt adhesive composition of the invention is stable on storage and is readily workable under the customary application conditions, more particularly in the temperature range from 100 to 200° C., and its viscosity is stable for a sufficiently long time, even in the case of application via open rolls. After setting or crystallization, it possesses a relatively high ultimate strength and heat resistance, and also effective resistance to all environmental effects.

The hotmelt adhesive of the invention in particular has a low reactivation temperature in combination with high heat stability. The adhesion of the applied adhesive to the surfaces of the laminating tool is low.

The hotmelt adhesive composition of the invention is suitable for all adhesive bonds which can be performed using hotmelt adhesives. The hotmelt adhesive composition of the invention is especially suitable as an adhesive for foil lamination, preferably by vacuum forming lamination or IMG lamination.

In vacuum forming lamination, an adhesive, in this case the hotmelt adhesive composition of the invention, is first applied to one side of a foil—a TPO foil, for example. The side in question may be, for example, the reverse of a decorative foil. This is followed by the actual forming lamination. The foil with the adhesive applied thereon is heated and is drawn by vacuum onto a substrate component, based for example on PP, resin-bound natural fibers, or ABS. In this operation, the melted hotmelt adhesive comes into contact with the substrate component for lamination. This is commonly accomplished by application of a vacuum to the substrate component, which is provided with holes, on the side of the substrate component that is opposite the side to be laminated.

IMG lamination (in-mold graining lamination) is a special instance of vacuum forming lamination, in which the smooth foil also receives its typical grain during the laminating operation described; the smooth foil is preferably a smooth TPO foil. For this purpose, the smooth foil is heated up to around 220° C. At this temperature, the foil is stretchable and it is possible to provide it with the appropriate grain. The first step in the IMG operation is to provide the foil, more particularly TPO foil, with the grain. In the $2^{nd}$ step, vacuum is used to apply the heated and adhesive-precoated foil onto the solid substrate.

The hotmelt adhesive composition of the invention is suitable with preference for vehicle construction, more particularly for automobile construction, as an adhesive, for example, in the lamination of foils, such as TPO foils, for example, onto nonpolar materials, such as polypropylene or natural-fiber substrate materials, for example, or onto polar substrates such as ABS, for example.

The statements below relating to the method of the invention for foil lamination do of course also apply to a particular degree to the uses identified above, and vice versa.

A further aspect of the invention relates to a method for producing an assembly composed of a substrate element and a foil by adhesive bonding, said method comprising the following steps:
a) the applying of a hotmelt adhesive composition of the invention to one side of a foil, preferably a polyolefin foil;

b) the heating of the foil coated with the hotmelt adhesive composition, for reactivating, and
c) the drawing of the reactivated foil, coated with the hotmelt adhesive composition, onto the substrate element, with the hotmelt adhesive composition coming into contact with the substrate element and, after cooling, producing the bonded assembly.

The foil is preferably a decorative foil. The foil is preferably a polyolefin foil and more particularly a TPO foil, in other words a foil based on a thermoplastic, olefin-based elastomer. Foils of this kind are available commercially in great diversity.

The foil, more particularly the polyolefin foil or TPO foil, may have a thickness, for example, of 0.05 mm to 5 mm, preferably 0.05 to 1 mm. It may have a single-layer or multilayer construction. It is clear to the person skilled in the art that foils, in addition to the polymeric base material, may also comprise other adjuvants and processing agents as well, such as further polymers or additives.

The substrate element is preferably a three-dimensionally shaped body. The material of the substrate element, or the surface of the substrate material that is to be laminated, may be any desired material, being made for example of plastic, especially polyolefins or ABS, metal, painted metal, wood, woodbase materials, or natural or synthetic fiber materials.

Examples of plastics materials are materials of polyethylene such as high-density polyethylene (HDPE), polyethylene terephthalate (PET), polystyrene (PS), polypropylene (PP), including glass fiber-reinforced PP, polyvinyl chloride (PVC), polycarbonate (PC), glass fiber-reinforced plastic (GRP), polymethyl methacrylate (PMMA), acrylonitrile-butadiene-styrene (ABS), polyamide (PA), and combinations thereof.

Suitable fiber material comprises natural or synthetic fiber materials, as for example materials composed of natural fibers of cellulose, cotton or protein, or of synthetic fibers of polyester, homopolymers or copolymers of ethylene and/or propylene, or viscose, or mixtures thereof. The fiber material may be, for example, a woven, laid or knitted fabric, preference being given to a felt or nonwoven.

The substrate element, or the surface of the substrate element that is for lamination, is preferably made of a material of polypropylene, natural fiber, e.g., a resin-bound natural fiber, or ABS. The polypropylene is preferably glass fiber-reinforced polypropylene.

Where necessary, the surface of the substrate element that is to be laminated may have been pretreated, by cleaning and/or by application of a primer, for example. In general, however, there is no need for application of a primer.

The hotmelt adhesive composition can be applied to the foil in a customary way. For example, the hotmelt adhesive composition is liquefied by heating and can be applied to the foil by customary coating techniques, such as brushing or rolling, for example.

The application temperature is typically in the range from 150 to 200° C., more particularly 160 to 180° C. At this temperature the adhesive is readily workable. The viscosity of the hotmelt adhesive compositions can be adapted to the application temperature.

Cooling produces the foil coated with the hotmelt adhesive composition. The layer thickness of the hotmelt adhesive layer is customarily relatively thin; the applied amount is situated, for example, in the range from 50 to 150 g/m².

The foils thus coated are stable on storage and can be stored even for weeks, which is very advantageous for industrial manufacture.

For the actual production of the assembly, the foil coated with the hotmelt adhesive composition is heated for reactivation of the hotmelt and is then applied or drawn onto the substrate element. The heating temperature for reactivation is typically in the range from 100 to 200° C., more particularly 140 to 180° C. This may take place in any possible way, such as in an oven, by means of hot air, or by IR irradiation, for example.

Following its reactivation by heating, the film is drawn onto or applied to the substrate element. Drawing-on ought usefully to take place as soon as possible after reactivation, as for example less than 60 s, preferably less than 20 s, after reactivation, in order to prevent excessive cooling of the hotmelt. The process of drawing-on puts the hotmelt adhesive composition in contact with the substrate element, so producing the adhesive bond between foil and substrate element by means of the hotmelt, after cooling.

The foil is commonly drawn on by pressure by means of presses or, preferably, by application of vacuum. The foil is drawn onto the substrate element preferably by vacuum forming lamination or IMG lamination. These processes have already been explained above.

The invention also relates to the assembly obtainable by the method described. The assembly is preferably an article of industrial manufacture, more particularly a component of a vehicle, preferably of an automobile.

EXAMPLES

The following raw materials were used for producing hotmelt adhesives. All of the stated softening points are determined according to DIN EN 1238, apart from that for the PP homopolymer HE40XI, which was determined as a Vicat softening temperature.

| | | |
|---|---|---|
| Escorez ®1401 | HC resin, softening point 119° C. | Exxon Mobil, USA |
| Regalite ®R 7100 | HC resin, softening point 102° C. | Eastman Chemical Co., USA |
| Hikorez ®A-2115 | HC resin, softening point 112° C. | Kolon Industries, Inc, Korea |
| Vestoplast ®703 | Amorphous or atactic poly-alpha-olefin, softening point 124° C. | Evonik, Germany |
| Vestoplast ®792 | Amorphous or atactic poly-alpha-olefin, softening point 108° C. | Evonik, Germany |
| Vestoplast ®608 | Amorphous or atactic poly-alpha-olefin, softening point 157° C. | Evonik, Germany |
| Polypropylene homopolymer HE40XI | Polypropylene homopolymer, softening point 154° C. | Polychim Industrie, France |
| Epolene ®E-43 | Maleic anhydride grafted polypropylene, softening point 158° C. | Westlake Chemical, USA |
| Licocene ®PP MA 6452 | Maleic anhydride grafted polypropylene, softening point 143° C. | Clariant, Switzerland |
| Licocene ®PP 6102 | Polypropylene wax, softening point 145° C. | Clariant, Switzerland |
| Tinopal ®OB | Optical brightener | BASF, Germany |
| Irganox ®1010 | Antioxidant/stabilizer | BASF, Germany |

Six hotmelt adhesive compositions (inventive examples 1 and 2 and comparative examples 1 to 4) were produced by combining the ingredients with one another in accordance with the parts by weight indicated in table 1 under reduced pressure in a stirrer at a temperature of 190° C.

The hotmelt adhesives produced were investigated for their properties by the methods set out below. The results are given in table 2.

Adhesion to Substrates

An investigation was conducted into the substrates to which the hotmelt adhesives adhere. The substrates investigated were made of polypropylene (PP), polyvinyl chloride (PVC), polyamide (PA), polycarbonate (PC), glass fiber-reinforced plastic (GRP), and polymethyl methacrylate (PMMA). The table recites the substrates to which the hotmelt adhered.

Viscosity

The adhesive is melted in a sealed tube at 200° C. in a heating cabinet for 20 minutes. 9.7 mg of adhesive are weighed out into a disposable sleeve and conditioned in a viscometer at the start temperature for 20 minutes; the viscosity is measured at 1, 2.5, 5, and 10 rpm; a note is made of the value established after 5 minutes of measurement; conditioning for 20 minutes takes place on each temperature increase (spindle #27, Brookfield viscometer).

Open Time

The open time is the maximum time between application of adhesive and bonding of the substrates, and is determined as follows:

- The adhesive is melted in a sealed tube at 200° C. in a heating cabinet for 20 minutes
- The adhesive is introduced into a 500p applicator on a hotplate at 200° C.; a film of adhesive is drawn down onto dried silicone paper (drawdown length about 30 cm)
- Preparation of a number of silicone paper strips (100×10 mm)
- The film is taken from the hotplate and placed on a bench conditioned at room temperature (23° C.), and the clock is started
- Approximately every 5 seconds, a paper strip is pressed gently by its nonsiliconized side onto the adhesive, using the finger, and slowly withdrawn again
- When the paper strip can be separated from the film of adhesive without sticking to it or without tearing, the clock is stopped and the time which has elapsed is recorded.

Initial Strength

- The adhesive is melted in a sealed tube at 200° C. in a heating cabinet for 20 minutes
- The adhesive is applied to one side of the PP test body; it is pressed by gentle pressure onto the other test body, and the bond is fixed with a weight of 500 g
- Test bodies used for this measurement are PP test bodies (100 mm×25 mm*4 mm); the area to be bonded is 25 mm×25 mm, adhesive thickness 1 mm
- Measurements are made of the initial strength (N/mm$^2$) after 3, 6, 10, 20, and 30 minutes
- Only the 30-minute value is recorded in the evaluation of the results.

Shore A

The Shore A is measured according to DIN EN ISO 868.

Softening Point

The softening point was measured by the ring & ball method, DIN EN 1238.

Heat Stability

- The adhesive is melted in a sealed tube at 200° C. in a heating cabinet for 20 minutes
- The adhesive is applied to one side of the PP test body; it is pressed by gentle pressure onto the other test body, and the bond is fixed with a weight of 500 g; a triplicate determination is carried out
- Test bodies used for this measurement are PP test bodies (100 mm×25 mm*4 mm); the area to be bonded is 25 mm×25 mm, adhesive thickness 1 mm
- After 24 hours, the specimens are hung in a heating cabinet and the bond is loaded with a weight of 1 kg. The heating cabinet is conditioned to 40° C. beforehand. After each hour, the temperature is raised by 10K. The temperature at which the bond failed is read off
- The heated stability is then the recorded temperature at which the bond was still intact (for example, if the bond fails at 140° C., the heat stability reported is 130° C.)

TABLE 1

(all figures in parts by weight)

|  | Comp. Ex. 1 | Comp. Ex. 2 | Inv. Ex. 1 | Inv. Ex. 2 | Comp. Ex. 3 | Comp. Ex. 4 |
| --- | --- | --- | --- | --- | --- | --- |
| Escorez ®1401 | 15.14 | | | | | |
| Regalite ®R 7100 | | 40.75 | | 16.27 | 16.41 | 16.22 |
| Hikorez ®A-2115 | | | 16.13 | | | |
| Vestoplast ®703 | 34.85 | | 36.88 | 37.96 | 38.29 | 36.76 |
| Vestoplast ®792 | 34.85 | 32.00 | 37.31 | 40.13 | 42.67 | 37.84 |
| Vestoplast ®608 | | 27.00 | | | | |
| Polypropylene homopolymer HE40XI | 5.77 | | | | | |
| Epolene ®E-43 | 9.13 | | | | | |
| Licocene ®PP MA 6452 | | | 9.46 | 5.42 | 2.41 | |
| Licocene ®PP 6102 | | | | | | 8.97 |
| Tinopal ®OB | 0.02 | | | | | |
| Irganox ®1010 | 0.24 | 0.25 | 0.22 | 0.22 | 0.22 | 0.22 |
| | 100.00 | 100.00 | 100.00 | 100.00 | 100.00 | 100.01 |

TABLE 2

|  | Comp. Ex. 1 | Comp. Ex. 2 | Inv. Ex. 1 | Inv. Ex. 2 | Comp. Ex. 3 | Comp. Ex. 4 |
| --- | --- | --- | --- | --- | --- | --- |
| Adhesion to substrate | PP, PVC, PA, PMMA | PP | PP, PVC, PA, PC, GRP, PMMA | PP, PVC, PC, GRP, PMMA | PP | PP |

TABLE 2-continued

| | Comp. Ex. 1 | Comp. Ex. 2 | Inv. Ex. 1 | Inv. Ex. 2 | Comp. Ex. 3 | Comp. Ex. 4 |
|---|---|---|---|---|---|---|
| Viscosity @ 180° C. [mPa * s] | 29 500 | 15 000 | 15 000 | 17 500 | 21 500 | 13 000 |
| Open time, 500 μm at 200° C. [sec.] | 25 | 30 | 30 | 40 | 40 | 35 |
| Initial strength [N/mm²] | 2.5 | 0.6 | 2.0 | 1.5 | 1.3 | 1.8 |
| Shore A | 80 | 52 | 80 | 75 | 73 | 78 |
| Softening point (Ring Ball) [° C.] | 157 | 130 | 130 | 124 | 127 | 127 |
| Heat stability PP-PP [° C.] | 110 | 60 | 100 | 90 | 90 | 100 |

Adhesion to ABS

The adhesion of the hotmelt adhesives to ABS substrates was investigated, by laminating a TPO foil coated with the hotmelt adhesive onto an ABS substrate at various laminating temperatures (140° C. and 200° C.). The experiments at 200° C. served for testing, but in practice a laminating temperature of 200° C. is too high and is not operationally suitable. The assemblies produced were evaluated, 24 hours after production, visually and by means of a manual peel test. The results are shown in table 3.

TABLE 3

Adhesion to ABS

| laminated @ | Comp. Ex. 1 | Comp. Ex. 2 | Inv. Ex. 1 | Inv. Ex. 2 | Comp. Ex. 3 | Comp. Ex. 4 |
|---|---|---|---|---|---|---|
| 140° C. | adhesive failure to the ABS | good adhesion, foam pullout TPO foil | good adhesion, foam pullout TPO foil | good adhesion, foam pullout TPO foil | poor adhesion to ABS | poor adhesion to ABS |
| 200° C. | good adhesion, foam pullout TPO foil | good adhesion, foam pullout TPO foil | good adhesion, foam pullout TPO foil | good adhesion, foam pullout TPO foil | poor adhesion to ABS | poor adhesion to ABS |

Evaluation of the Reactivation Behavior of Precoated TPO Foils

For inventive example 1 and comparative example 1, a laminating operation with different waiting times between reactivation and pressing was simulated. Evaluation was made visually and with a manual peel test. Materials used were as follows:

| Foil | TPO foil without primer |
|---|---|
| Substrate | Polypropylene (PP GF 30: PP with 30% glass fiber) |
| Hotmelts | Inventive example 1 and comparative example 1 |

Production of Assemblies

The adhesive was applied in each case at 80 g/m² to the TPO foil at 200° C. in the case of comparative example 1 or at 170° C. in the case of inventive example 1. Cooling gave the foil coated with adhesive. The applied adhesive was reactivated using IR. After a waiting time x, the reactivated TPO foil was placed onto PP and rolled on using a 5 kg roller. Cooling (around 5-10 min) was followed by the peel test. The results for the test with the hotmelt of inventive example 1 are shown in table 4, and the results for the test with the hotmelt of comparative example 1 are shown in table 5.
Evaluation:
sat. satisfactory=foam pullout, foil
unsat. unsatisfactory=adhesive failure to the PP

TABLE 4

Assembly with hotmelt from inventive example 1

| Reactivation temperature | Waiting time after reactivation for pressing | | | | | |
|---|---|---|---|---|---|---|
| | immediate | 6 s | 10 s | 12 s | 15 s | 20 s |
| 170° C. | sat. | sat. | sat. | sat. | sat. | sat. |
| 160° C. | sat. | sat. | sat. | sat. | sat. | sat. |
| 150° C. | sat. | sat. | sat. | sat. | sat. | sat. |
| 140° C. | sat. | sat. | sat.* | sat.* | unsat. | unsat. |

*partial foam pullout, foil + adhesive failure to the PP

TABLE 5

Assembly with hotmelt from comparative example 1

| Reactivation temperature | Waiting time after reactivation for pressing | | | | | |
|---|---|---|---|---|---|---|
| | immediate | 6 s | 10 s | 12 s | 15 s | 20 s |
| 200° C. | sat. | sat. | sat. | sat. | sat. | unsat. |
| 190° C. | sat. | sat. | sat.* | sat.* | sat.* | unsat. |
| 180° C. | sat. | sat. | sat.* | sat.* | unsat. | unsat. |
| 170° C. | sat. | sat.* | unsat. | unsat. | unsat. | unsat. |

*partial foam pullout, foil + adhesive failure to the PP

The invention claimed is:

1. A method for producing a bonded assembly composed of a substrate element and a foil by adhesive bonding, the method comprising the following steps:
   a) applying a hotmelt adhesive composition to one side of a foil, wherein the hotmelt adhesive composition comprises
      1) at least one atactic poly-α-olefin (APAO) which is solid at 25° C.;
      2) at least one hydrocarbon resin having a softening point of at least 80° C., measured by the ring & ball method according to DIN EN 1238; and
      3) at least one maleic anhydride-grafted wax having a softening point of not more than 150° C., measured by the ring & ball method according to DIN EN 1238, which is a maleic anhydride-grafted polypropylene wax or a maleic anhydride-grafted polyethylene wax,
   wherein a fraction of the at least one maleic anhydride-grafted wax in the hotmelt adhesive composition is at least 3 wt %,
   wherein the hotmelt adhesive composition contains no atactic poly-α-olefin containing silane groups, and
   wherein a fraction of further thermoplastic polymers which differ from 1) the atactic poly-α-olefin (APAO), 2) the hydrocarbon resin, and 3) the maleic anhydride-grafted wax in the hotmelt adhesive composition is less than 5 wt % of the hotmelt adhesive composition;
   b) heating the foil coated with the hotmelt adhesive composition, for reactivating, and
   c) drawing the reactivated foil, coated with the hotmelt adhesive composition, onto the substrate element, with the hotmelt adhesive composition coming into contact with the substrate element and, after cooling, producing the bonded assembly.

2. The method as claimed in claim 1, wherein the foil is a TPO foil and/or the substrate element, or the surface of the substrate element to be laminated, is made of a polypropylene, natural-fiber or ABS material, and/or the foil is drawn onto the substrate element by vacuum forming lamination or IMG lamination.

3. An assembly obtainable by a method as claimed in claim 1.

4. The method as claimed in claim 1, wherein the hotmelt adhesive composition contains substantially no further thermoplastic polymers which differ from a) the atactic poly-α-olefin (APAO), b) the hydrocarbon resin, and c) the maleic anhydride-grafted wax in the hotmelt adhesive composition.

* * * * *